United States Patent [19]

Ikemori

[11] Patent Number: 4,647,160
[45] Date of Patent: Mar. 3, 1987

[54] SMALL-SIZED WIDE ANGLE ZOOM OBJECTIVE

[75] Inventor: Keiji Ikemori, Kanagawa, Japan

[73] Assignee: Canon Kabushiki Kaisha, Japan

[21] Appl. No.: 733,856

[22] Filed: May 13, 1985

Related U.S. Application Data

[63] Continuation of Ser. No. 450,742, Dec. 17, 1982, abandoned.

[30] Foreign Application Priority Data

| Dec. 24, 1981 | [JP] | Japan | 56-215482 |
| Apr. 13, 1982 | [JP] | Japan | 57-61531 |
| May 19, 1982 | [JP] | Japan | 57-84171 |
| Jul. 23, 1982 | [JP] | Japan | 57-128565 |

[51] Int. Cl.$^4$ ............................................. G02B 15/14
[52] U.S. Cl. ............................................. 350/426
[58] Field of Search .................... 350/423, 426, 427

[56] References Cited

U.S. PATENT DOCUMENTS 4,168,110 9/1979 Itoh ..................... 350/426

FOREIGN PATENT DOCUMENTS 2556964 7/1976 Fed. Rep. of Germany ...... 350/427

Primary Examiner—John K. Corbin
Assistant Examiner—Rebecca D. Gass
Attorney, Agent, or Firm—Toren, McGeady and Goldberg

[57] ABSTRACT

A small-sized wide angle zoom objective comprising, from front to rear, a 1st lens unit of negative power, a 2nd lens unit of positive power and a 3rd lens unit, wherein the 1st and 2nd units are made axially movable to effect zooming.

19 Claims, 109 Drawing Figures

PRIOR ART
FIG.1
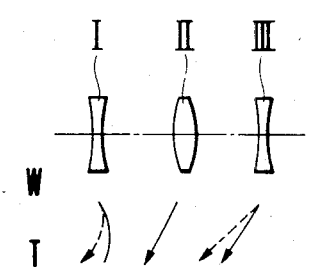
PRIOR ART
FIG.2a
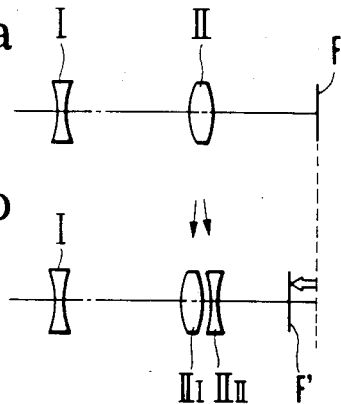
FIG.2b
PRIOR ART
FIG.3a  FIG.3b
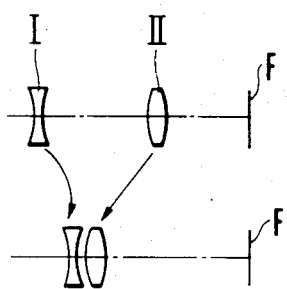
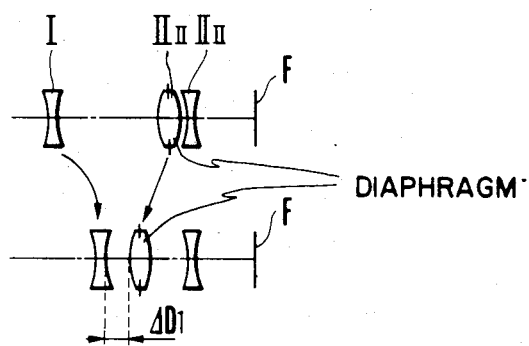
DIAPHRAGM
PRIOR ART
FIG.4a  FIG.4b
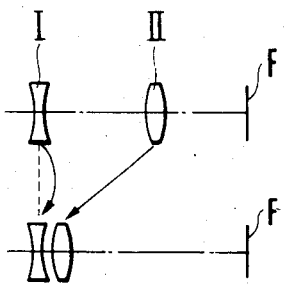
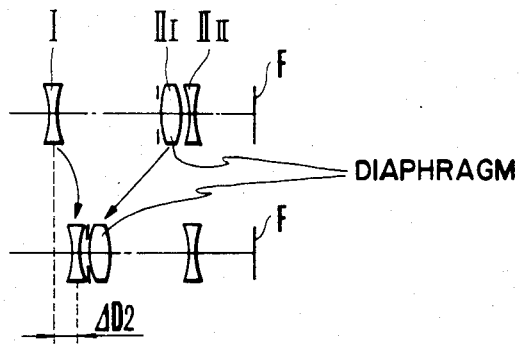
DIAPHRAGM

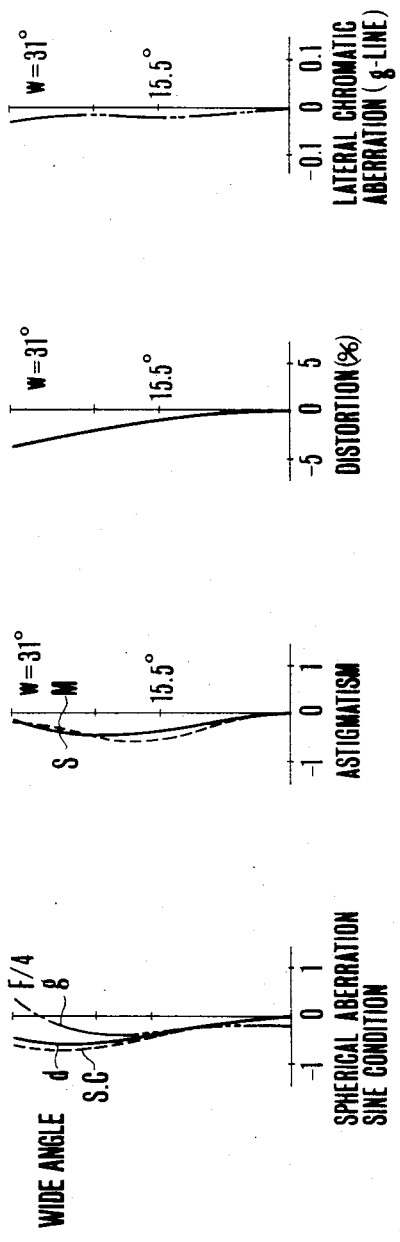
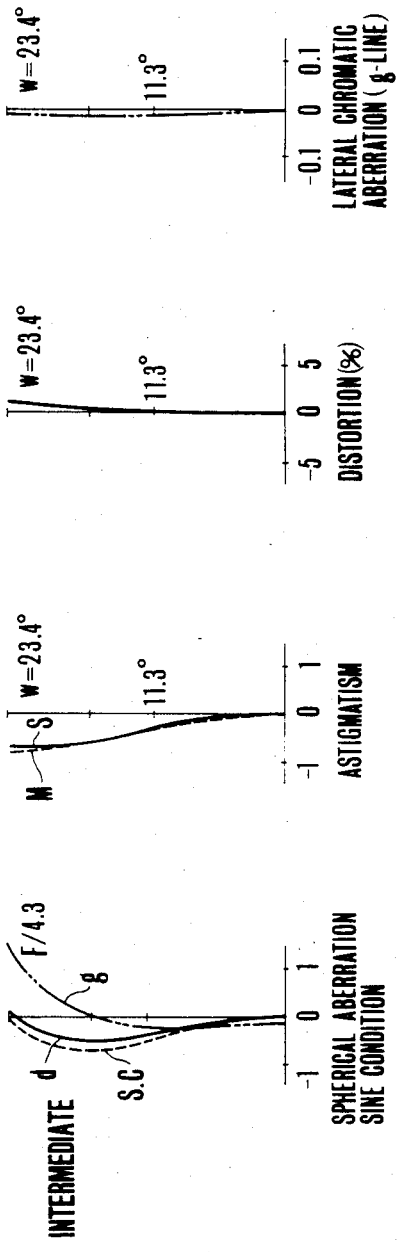

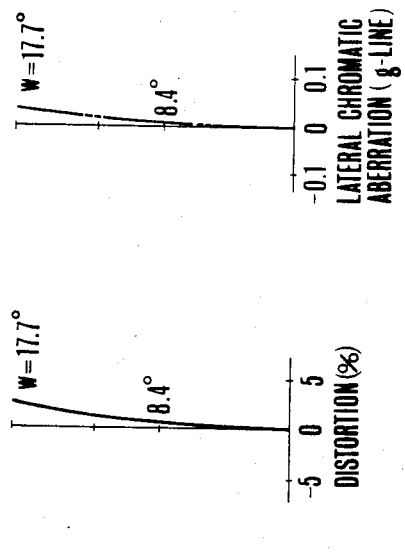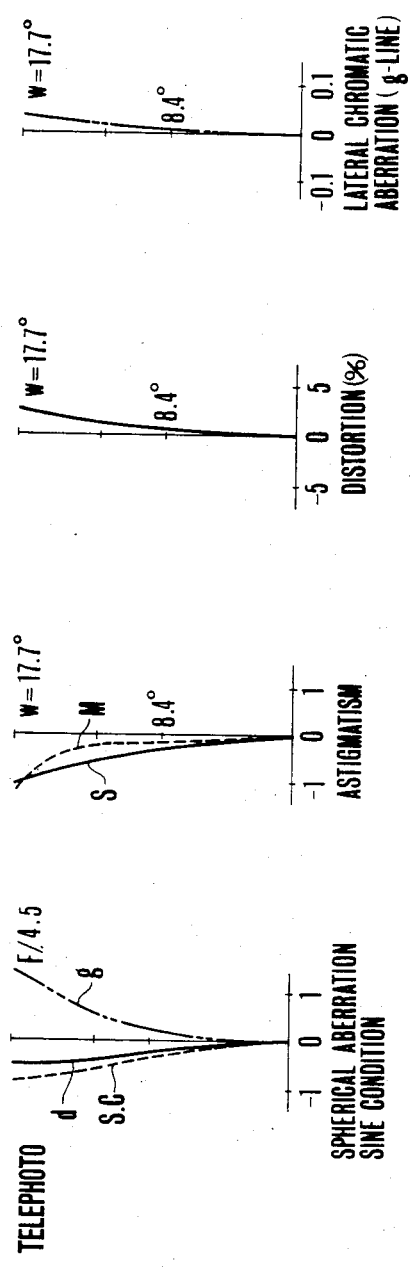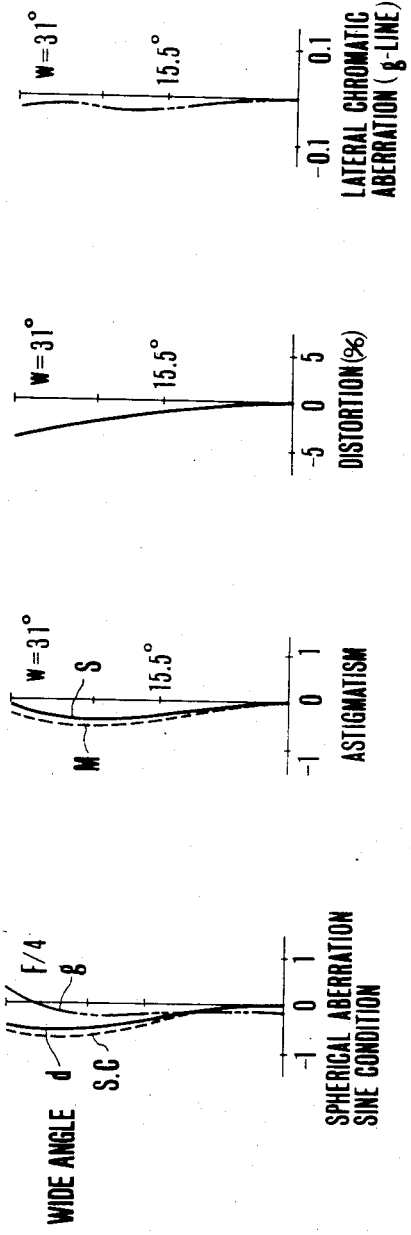

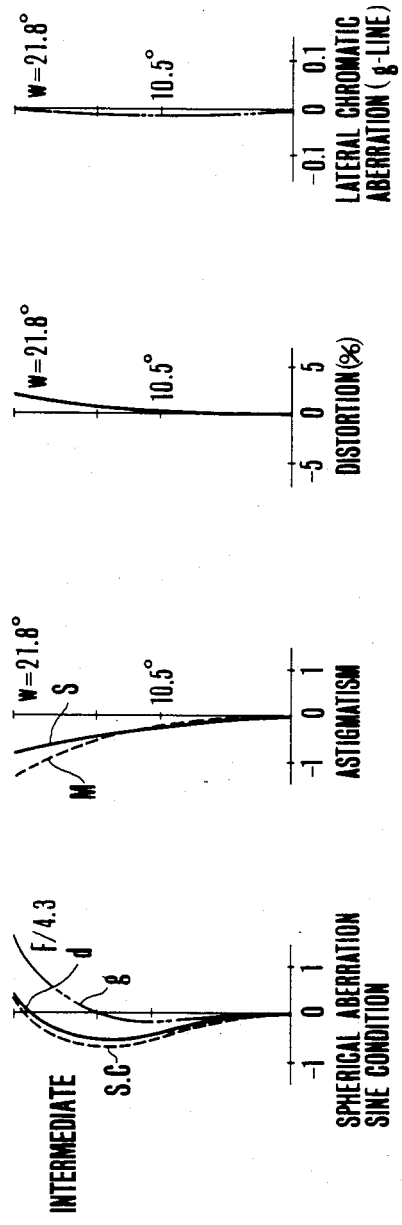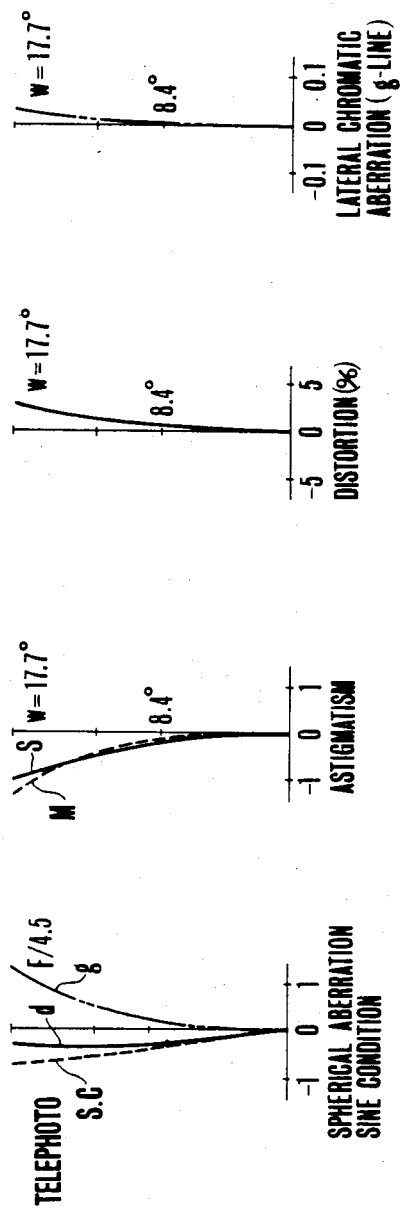

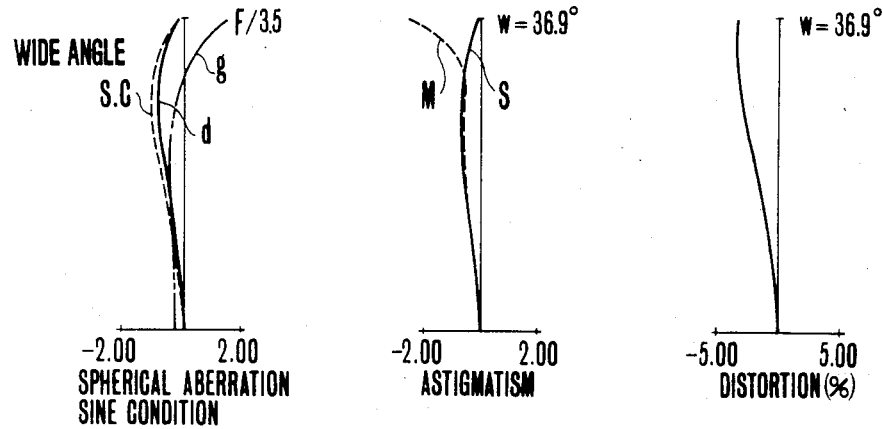
FIG.16a1  FIG.16a2  FIG.16a3
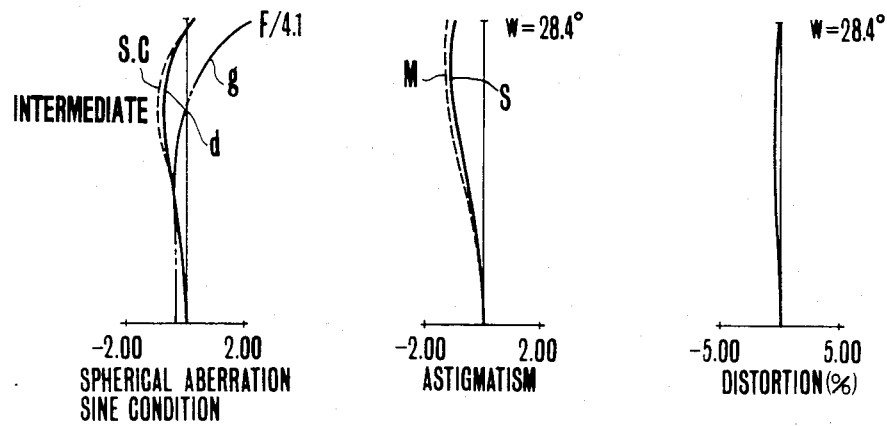
FIG.16b1  FIG.16b2  FIG.16b3
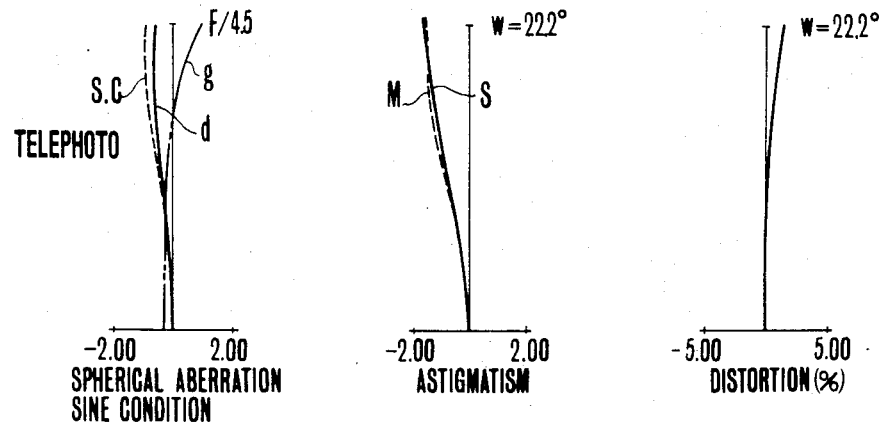
FIG.16c1  FIG.16c2  FIG.16c3

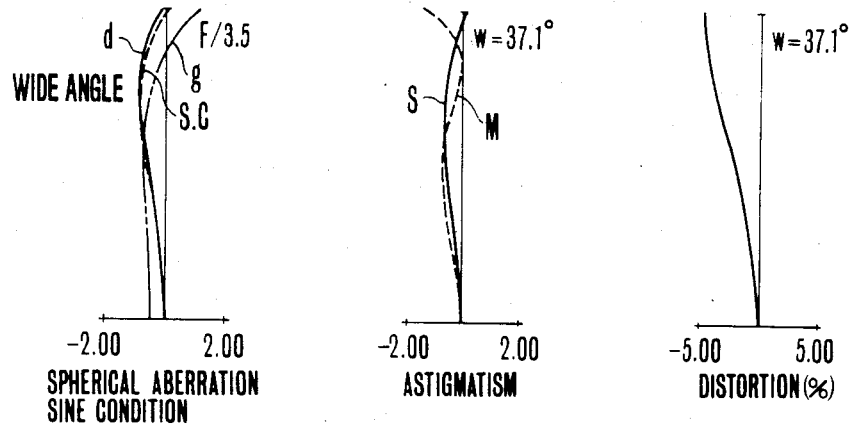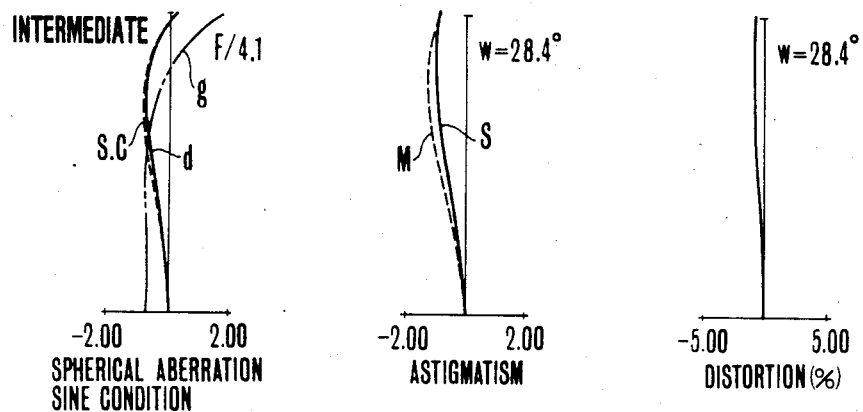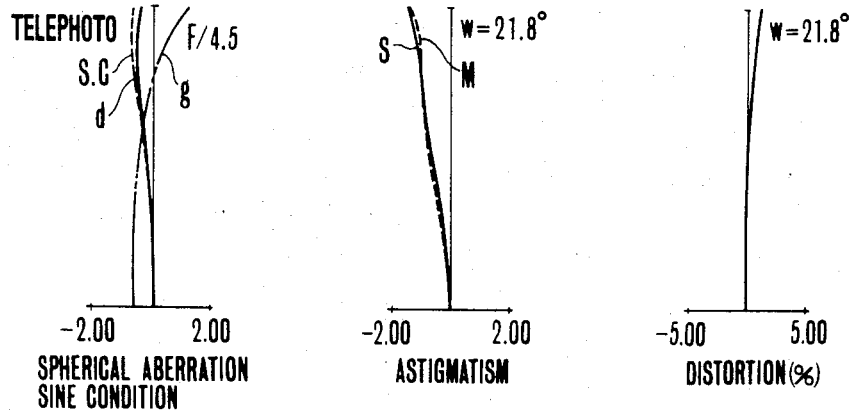

FIG.18a1
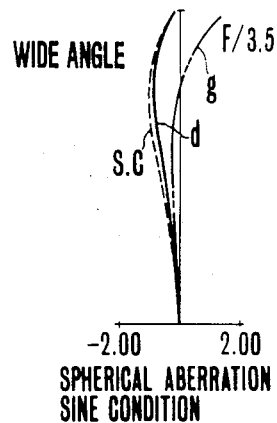
FIG.18a2
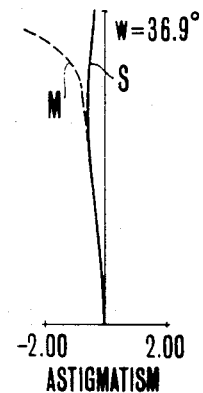
FIG.18a3
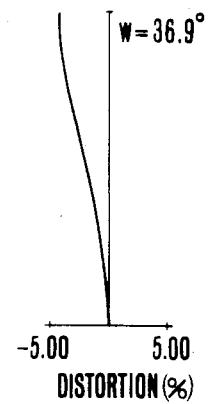
FIG.18b1
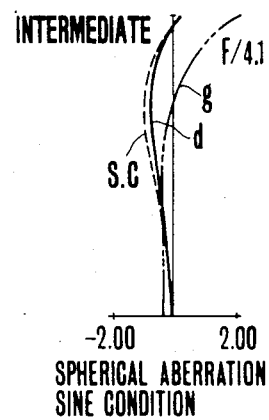
FIG.18b2
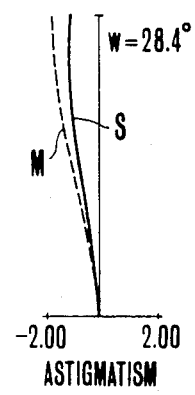
FIG.18b3
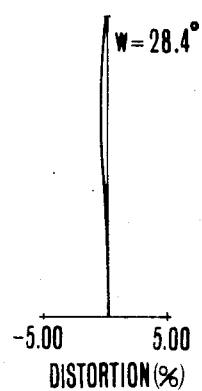
FIG.18c1
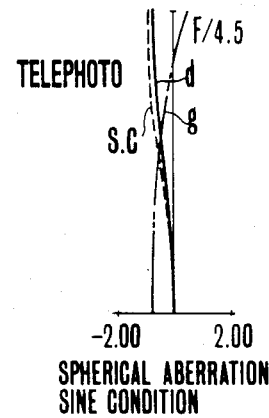
FIG.18c2
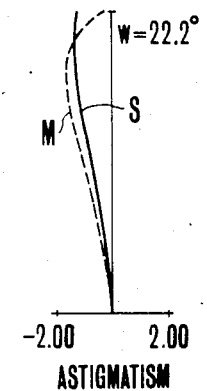
FIG.18c3
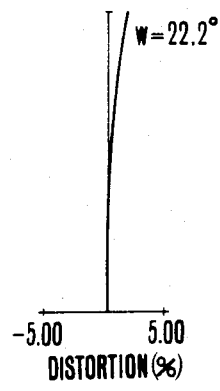

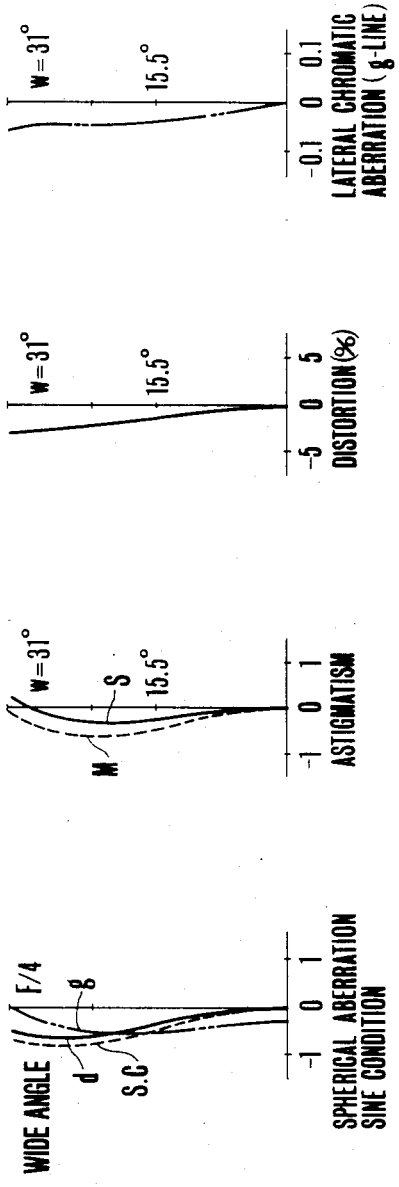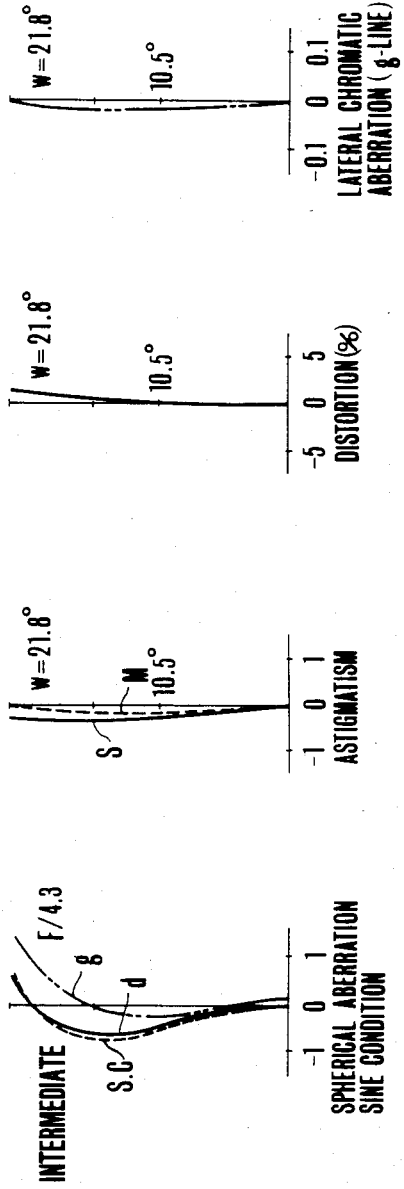

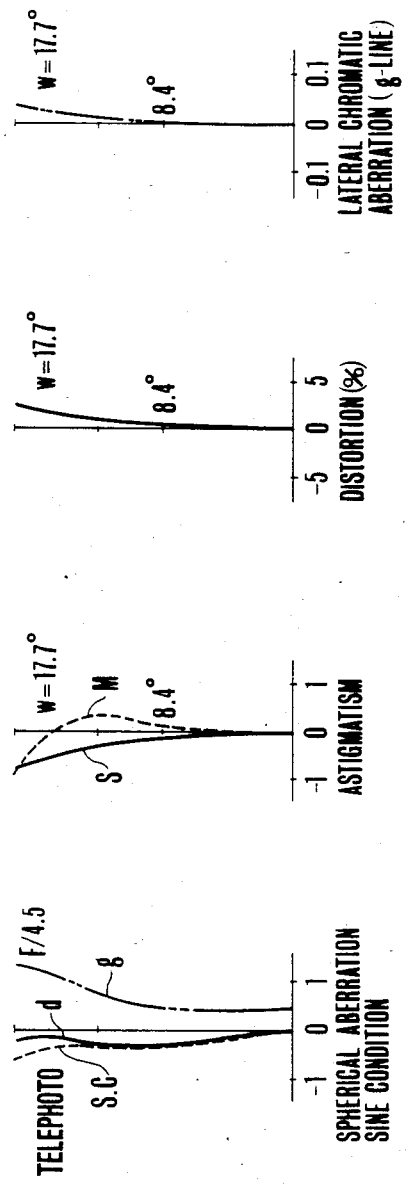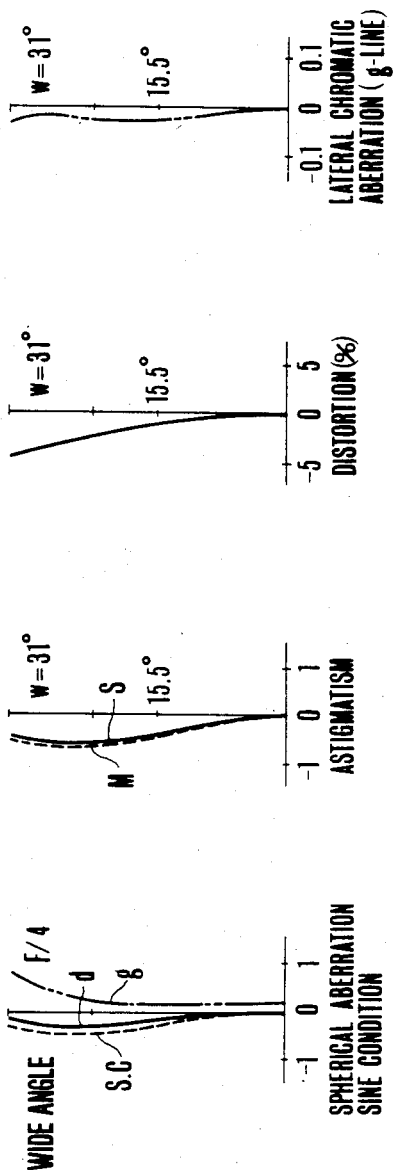

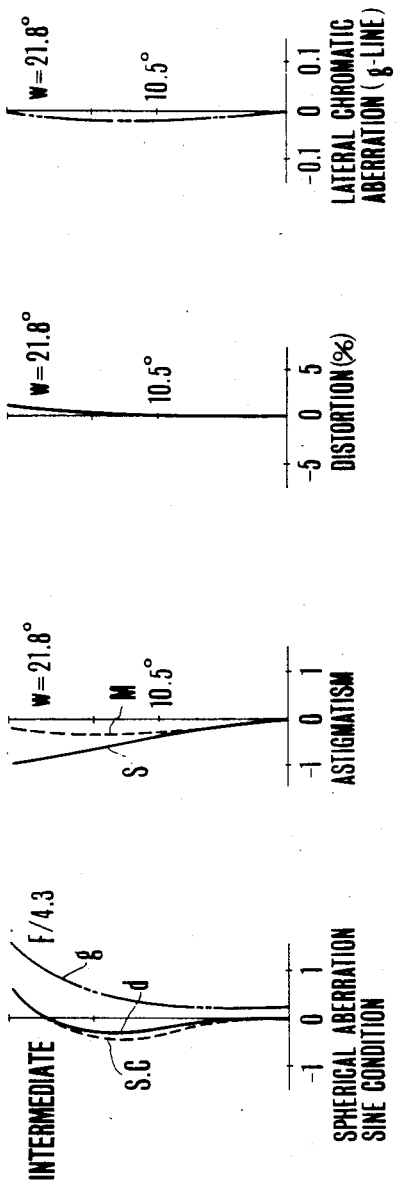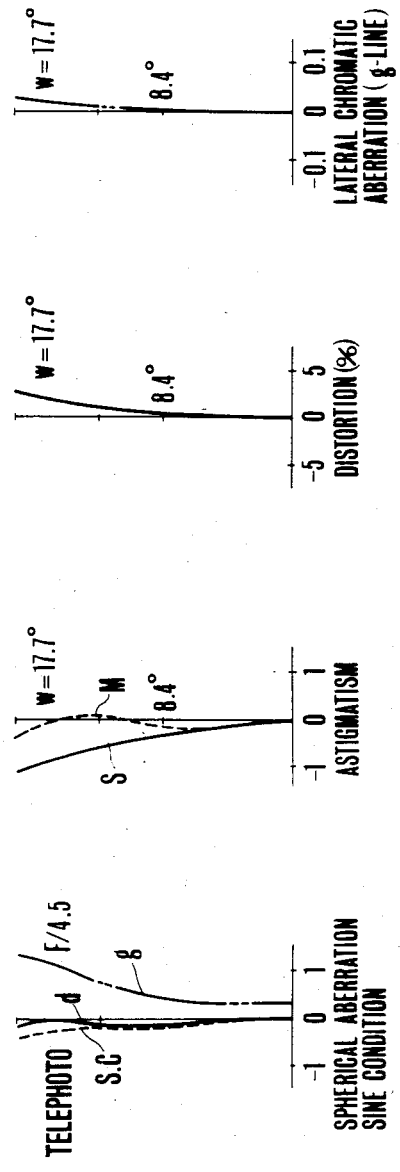

FIG.21a1
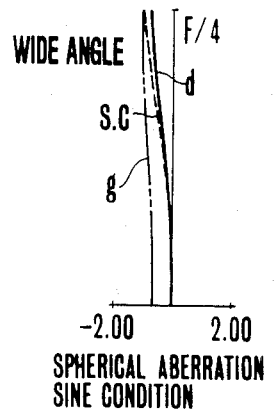
SPHERICAL ABERRATION
SINE CONDITION
FIG.21a2
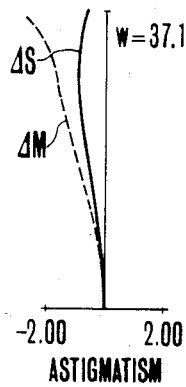
ASTIGMATISM
FIG.21a3
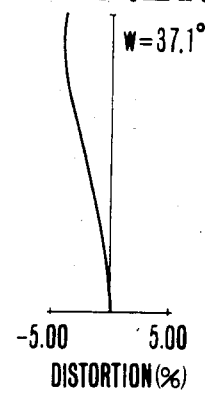
DISTORTION(%)
FIG.21b1
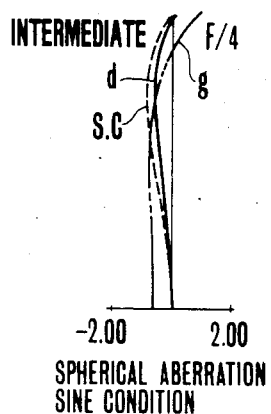
SPHERICAL ABERRATION
SINE CONDITION
FIG.21b2
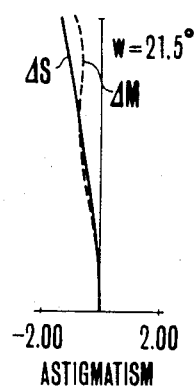
ASTIGMATISM
FIG.21b3
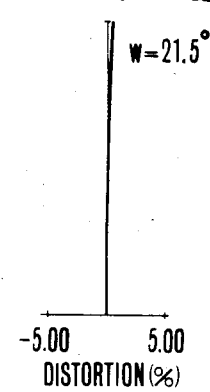
DISTORTION(%)
FIG.21c1
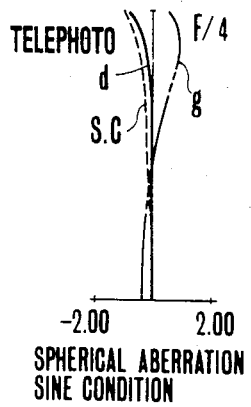
SPHERICAL ABERRATION
SINE CONDITION
FIG.21c2
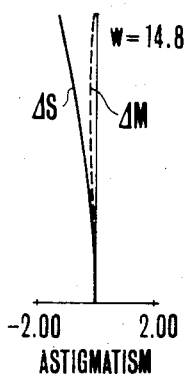
ASTIGMATISM
FIG.21c3
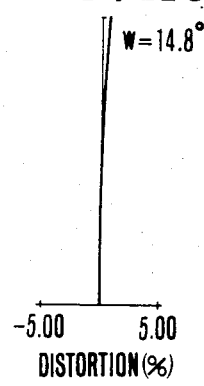
DISTORTION(%)

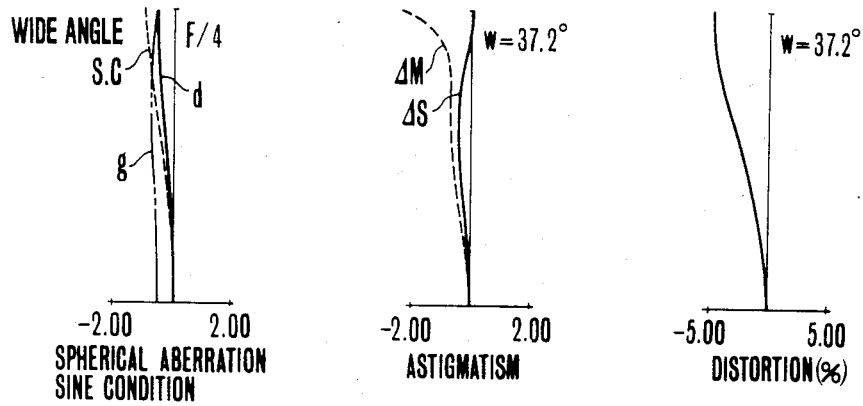
FIG.22a1  FIG.22a2  FIG.22a3
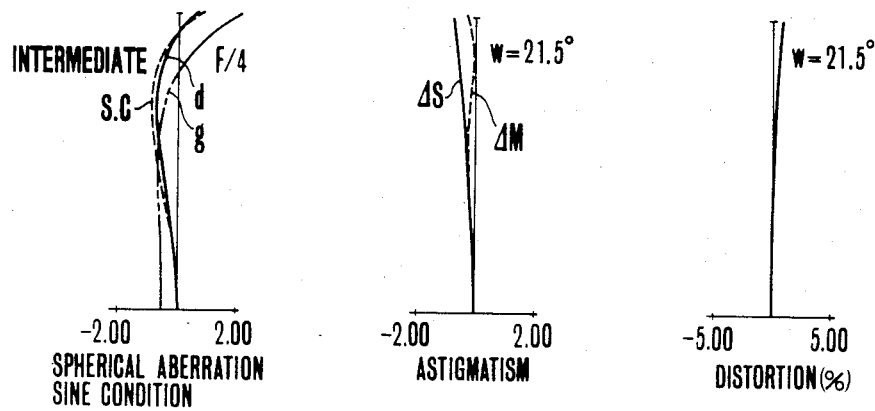
FIG.22b1  FIG.22b2  FIG.22b3
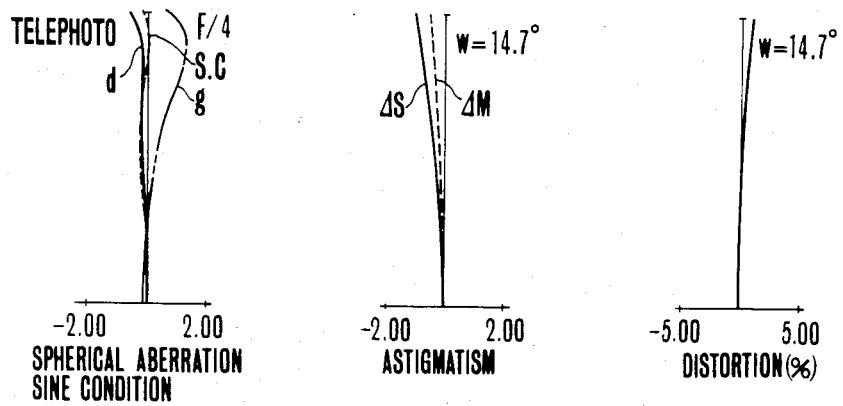
FIG.22c1  FIG.22c2  FIG.22c3

SMALL-SIZED WIDE ANGLE ZOOM OBJECTIVE

This is a continuation of application Ser. No. 450,742, filed Dec. 17, 1982, now abandoned.

BACKGROUND OF THE INVENTION

1. Field of the Invention

This invention relates to zoom objectives, and, more particularly, to small-sized, wide angle zoom objectives having three lens units with the first two lens units counting from front made movable to effect zooming.

2. Description of the Prior Art

In the past, in order to achieve a reduction of the bulk and size of a zoom objective lens, such lens has been formed by a diverging 1st lens unit and a converging 2nd lens unit with the air separation therebetween being varied to effect zooming, or to the so-called two-component type, and many zoom objectives of this type have been proposed. The present applicant also has made proposals in Japanese Laid Open Patents Nos. Sho 53-132360 and 56-19022. In the former, the diverging front or 1st lens unit is made up of three lens members, and its power is somewhat strengthened to reduce the interval between the principal points of the front and rear lens units in the telephoto position to some extent. In this manner a valuable decrease in the diameter of the front lens members and the total length of the objective (the distance from the front vertex to the image plane) particularly in the wide angle position is achieved. In the latter, on the other hand, the front or 1st lens unit is imparted with linearly progressive axial movement when zooming, thus providing achievement of a valuable decrease in the total length of the objective in the telephoto position, although the power of the diverging front or 1st lens unit is weaker than that in the former zoom objective. To achieve a further advance in the compactness of the zoom lens system, in the former case, the power of the diverging front or 1st lens unit may be further strengthened with an advantage that the total length of the complete objective in the wide angle position can be further shortened. Conversely when in the telephoto position, however, the total length becomes progressively longer, finally exceeding that when in the wide angle position. In the latter case, on the other hand, it is advantageous at shortening the total length in the telephoto position. It is, however, in the wide angle position that the total length tends to increase and further that a large increase in the diameter of the front lens members will result. For a general solution of the problem of most effectively shortening the total length of the zoom objective of the two-component type, it is preferred to employ the rule of design that the total lengths in the wide angle and telephoto positions are equal to each other.

SUMMARY OF THE INVENTION

An object of the present invention is to provide a wide angle zoom objective of reduced size having features found in the two-component type of zoom objective with achievement of shortening the total length by employing a new form and construction and arrangement of the lens members, while still preserving very high grade imaging performance.

Another object of the present invention is to provide a wide angle zoom objective of reduced size with a high range of image magnifications and with limitation of the bulk and size to a minimum while still permitting good correction of aberrations.

To achieve these objects, one of the features of the present invention is that the zoom objective is constructed with three lens units of which the 1st after counting from the front, is divergent and the 2nd is convergent whereby the aforesaid 1st lens unit and 2nd lens unit are made axially movable for zooming in front of the 3rd lens unit, which remains stationary.

Additional features are that the 1st lens unit, 2nd lens unit and 3rd lens unit are given respective appropriate refractive powers, and each lens unit has a suitable configuration. When these features are within the limits stated, greatly improved results are attained.

BRIEF DESCRIPTION OF THE DRAWINGS

FIG. 1 is a schematic view illustrating the zooming method employed in the conventional zoom lenses.

FIGS. 2-$a$ and -$b$, FIGS. 3-$a$ and -$b$, and FIGS. 4-$a$ and -$b$, are schematic views each illustrating the predesigns of the conventional zoom objective in comparison with an embodiment of the zoom objective according to the present invention.

FIGS. 14 through 22 are graphic representations of all aberrations of the objectives of FIGS. 5 to 13 respectively.

DETAILED DESCRIPTION OF THE PREFERRED EMBODIMENTS

Figure 5:
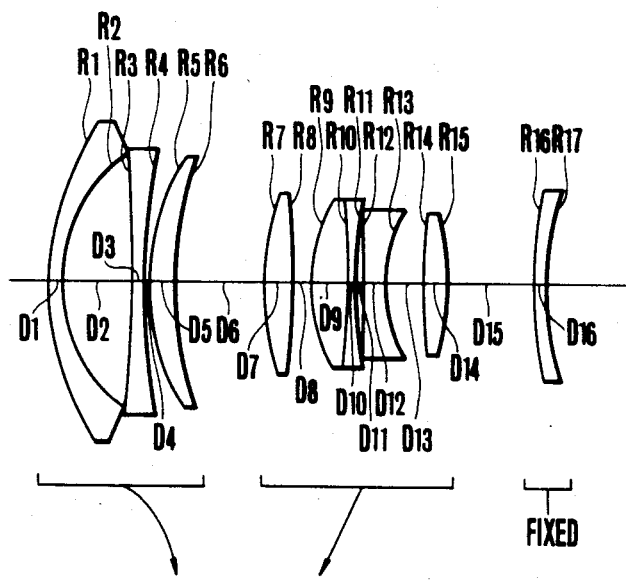
FIGS. 5 through 13 are lens block diagrams of embodiments 1 through 9 of the present invention respectively.
Figure 6:
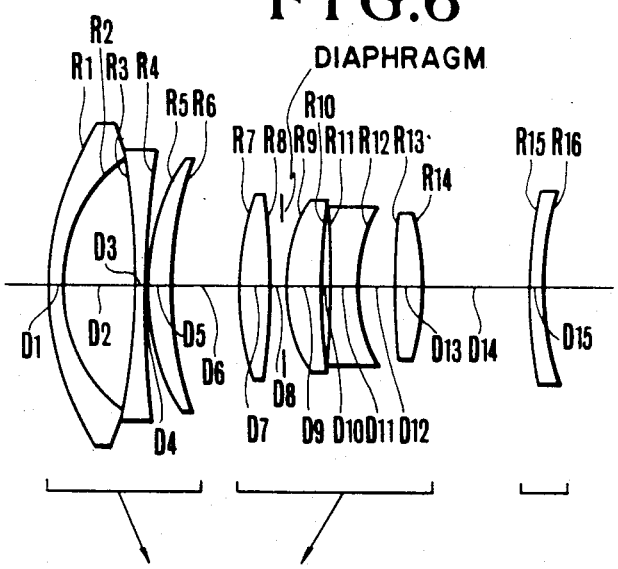
Figure 7:
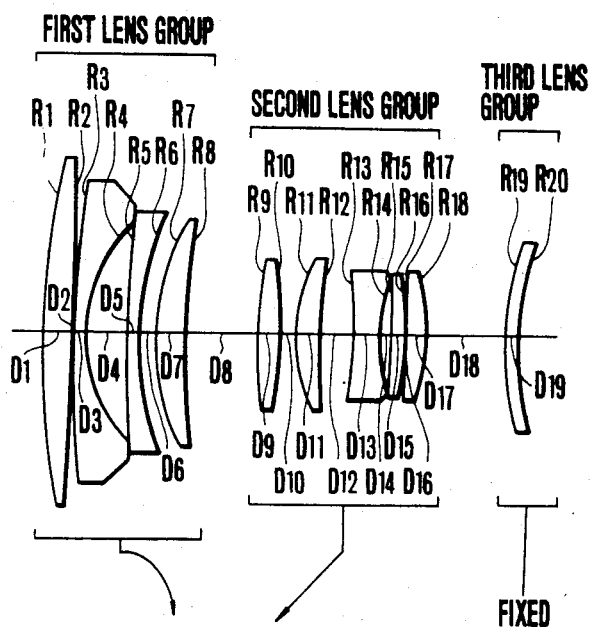
Figure 8:
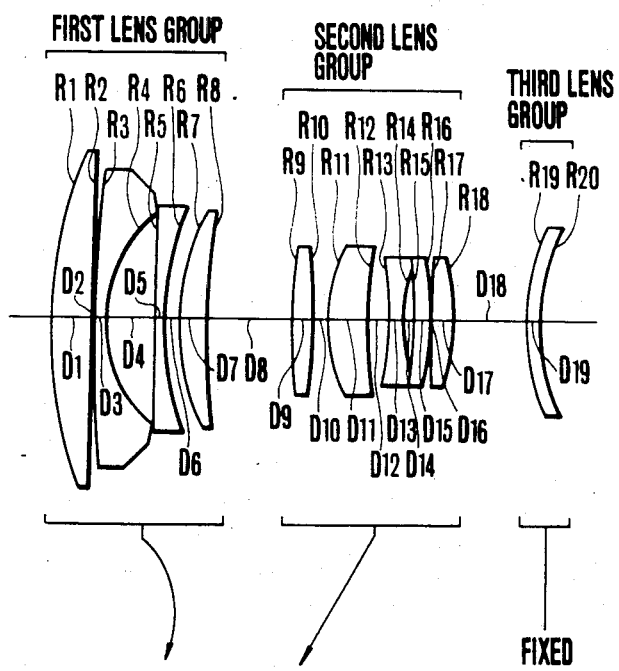
Figure 9:
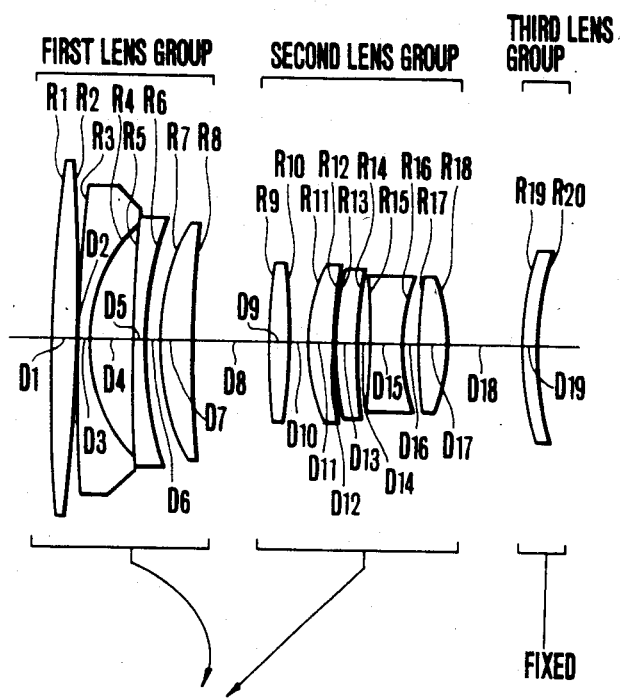
Figure 10:
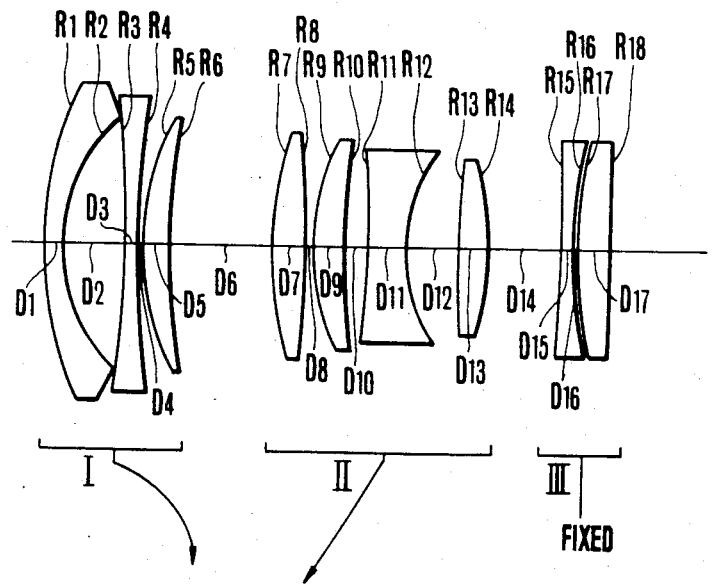
Figure 11:
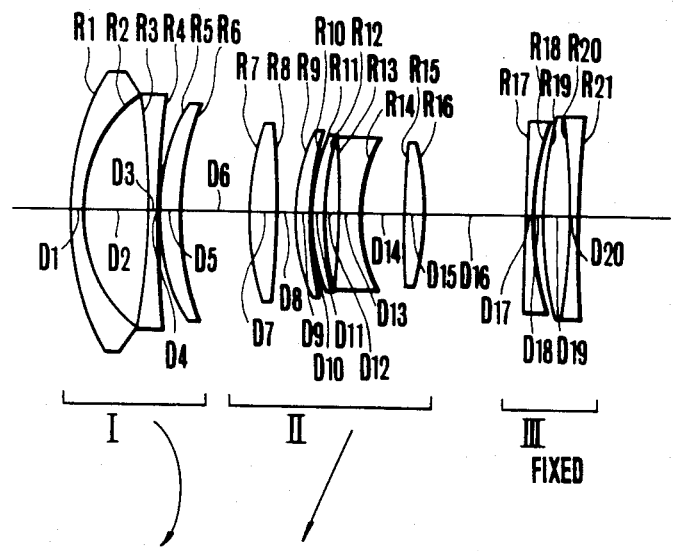
Figure 12:
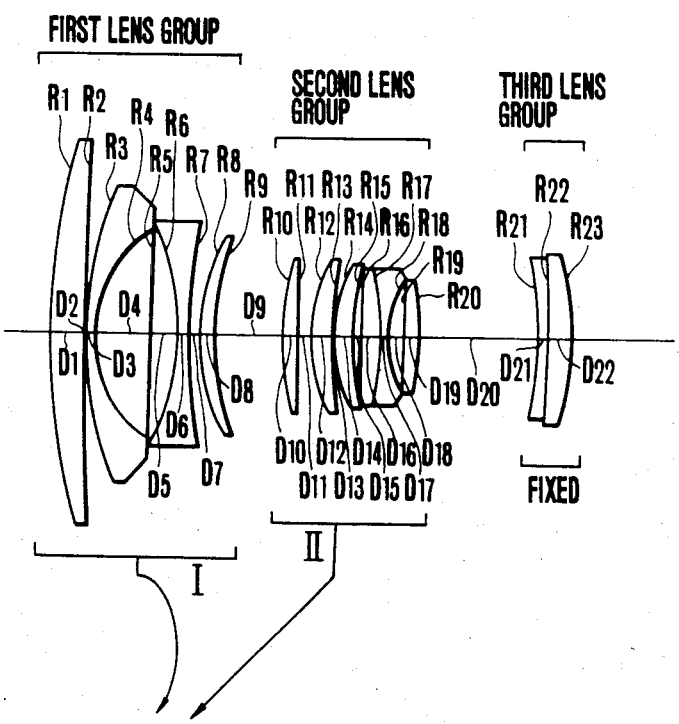
Figure 13:
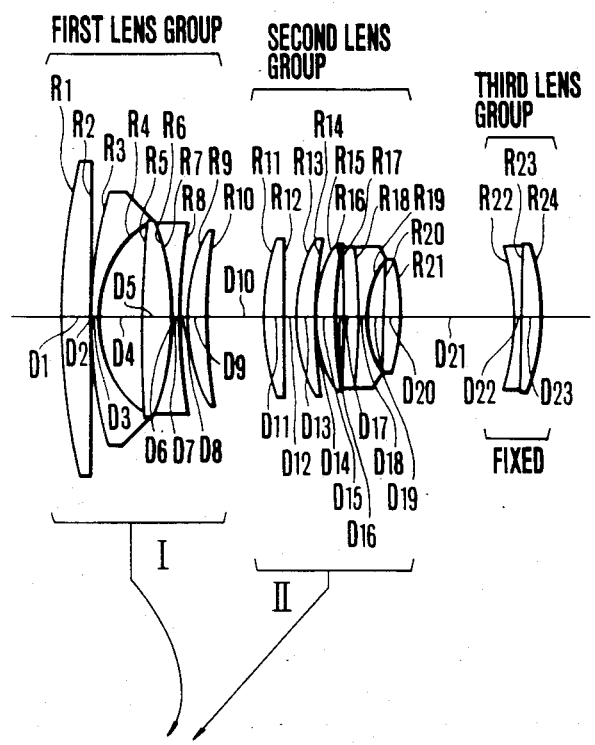

The zoom objective of the present invention may be considered in analogy to the conventional two-component zoom objective as comprising a converging rear or 2nd lens unit which is divided into two parts with the front one of convergence and the rear one of either divergence or convergence, whereby the converging front part only is made axially movable together with the diverging 1st lens unit to effect zooming.

As is known in the art, there has been another proposal for the zoom objective comprising, as illustrated in FIG. 1, a diverging 1st unit I, a converging 2nd unit II and a diverging 3rd unit III, that the 2nd and 3rd units are moved forward, while the 1st unit is simultaneously moved in non-linear progression, when zooming from the wide angle to the telephone position. With such zoom type, to retain the zoom ratio in somewhat high a level, it is required that the total movement of the 2nd unit be increased, and the paths of movement of the 1st and 3rd unit be changed as indicated by dashed line curves in the same drawing. In this case, the 1st unit tends to project farther ahead in the telephoto setting than in the wide angle setting. The expansion of the total length of the objective in the telephoto position will increase the bulk and size of the lens system.

As the total zooming movement of the 3rd unit reduces, the proportion of that part of the zooming movement of the 1st unit which directs toward the rear increases so that the equivalent zoom ratio can be obtained by a lesser zooming movement of the 2nd unit.

The zoom objective of the present invention has features with use of such properties of the zoom lens and such features of the two-component zoom type to achieve a further minimization of the bulk and size of the zoom lens while still permitting high grade optical performance.

Next, with regard to the zoom lens according to the present invention, taking an example of the lens predesign that the 3rd lens unit is made of divergence, and comparing with that type which has been proven to be advantageous for achieving minimization of the bulk and size of the zoom objective, or the so-called two-component zoom type, the rules of design of the invention, which are suited for facilitating a minimization of the bulk and size of the zoom objective, will be explained by reference to the drawings.

FIGS. 2-$a$ and 2-$b$ are the predesigns of the conventional two-component zoom objective and of a zoom objective of the present invention respectively. I is a negative 1st lens unit; II is a positive 2nd unit; and F is a film plane. As illustrated in FIG. 2-$b$, the division of the converging rear or 2nd unit into two parts $II_I$ and $II_{II}$ of positive and negative powers respectively gives a similar configuration to that of the zoom objective of the present invention which may be considered for these two parts to constitute a telephoto type lens with the result that the film plane F is shifted forward and takes its place at a position indicated by F', and, therefore, that the back focus is shortened. This makes it possible to shorten the total length of the lens system in both the wide angle and telephoto positions.

What change results in the total zooming movement by that division is illustrated in FIGS. 3-$a$ and -$b$ and 4-$a$ and -$b$. Since the rear part $II_{II}$ has a negative power, the positive power of the front part $II_I$ is necessarily stronger than that of the original unit II. Therefore, the required total zooming movement of the front part $II_I$ for the same zoom ratio can be lessened by a distance $\Delta D_1$ illustrated in FIG. 3-$b$ as compared with FIG. 3-$a$. This allows for the interval between the principal points of the diverging 1st unit I and the converging front part $II_I$ to be reduced by the $\Delta D_1$. Thus a further reduction of the total length of the lens system can be achieved.

In addition to the advantage which is produced based on the assumption that the power of the diverging 1st unit is left unchanged from that of the diverging 1st unit of the conventional two-component zoom objective, according to the zoom lens predesign of the invention, it is also made possible to facilitate a further reduction of the total length of the lens system than when the conventional method, i.e., that which has been found to be very effective in reducing the bulk and size of the two-component zoom objective by increasing the power of the 1st unit so as to make the total length in the wide angle position almost equal to that in the telephoto position, is in use.

In this connection, it should be explained that, as has been stated above, the zoom objective of the present invention admits of reducing the total zooming movement of the converging 2nd unit from that of the conventional two-component zoom objective, while still maintaining the constant equivalent zoom ratio. With the wide angle position as the start point, therefore, when zoomed to the telephoto position, the diverging 1st unit I may be located backward at a distance $\Delta D_2$ indicated in FIG. 4-$b$ from the point in position of the conventional one illustrated in FIG. 4-$a$. Since, therefore, the total length in the telephoto position becomes shorter than that in the wide angle position, a possibility of shortening the total length in the wide angle position is produced. Thus, a further minimization of the total length of the lens system can be achieved when the power of the diverging 1st lens unit is further strengthened. For a better understanding, the foregoing discussion on the primary features of a new type of zoom objective according to the present invention has been presented as compared with the conventional or two-component zoom type.

In the alternative case where the 3rd unit of the zoom objective of the invention is divergent, the total length of the lens system tends to become slightly longer than when it is convergent. But, because of the convergence of the 3rd unit, particularly regarding a high-range zoom objective, all aberrations become easy to correct throughout the entire zooming range. This allows for the power of the 1st unit to be strengthened. As a result, even when the 3rd unit is divergent, achievement of a valuable decrease in the total length of the lens system is provided as well.

According to the present invention, a zoom objective of the type described above has the rules of design which are sufficient to achieve a valuable decrease in the bulk and size of the lens system and good correction of aberrations. However, with the diverging 3rd unit, in order to obtain a further improvement of the optical performance and to achieve a further reduction of the total length of the lens system, it is preferred to satisfy the following conditions:

The 1st condition is that, letting $f_{III}$ denote the focal length of the 3rd unit, $|f_{III}|$ is equal to or larger than the longest focal length $f_T$ of the entire system, or $|f_{III}| \geq f_T$. This leads to limit the power of the 2nd unit so as not to produce extremely large aberrations and also to provide a necessary back focus in the wide angle position. When out of this range, the aberrations ascribable to the 2nd unit increase so greatly that it is difficult to perform good correction of image aberrations, and the back focus becomes too short to provide a clearance for mirror-up even in the wide angle position when in use with a 35 m/m TTL type single lens reflex camera.

The 2nd condition is that, letting $f_I$ denote the focal length of the 1st unit, $|f_I|$ is equal to or smaller than $f_T$, or $|f_I| \leq f_T$. This results in a shortened total length of the entire system, and a decreased diameter of the front members of the zoom objective. When this condition is violated, the total length of the lens system in the wide angle position and the diameter of the front members of the objective become too large to achieve an advance in the compactness with ease. Further, for a zoom ratio of less than 2 and a full open F-number of about F/4, as in embodiments of the invention to be described later, it is preferred to construct the diverging 3rd unit in the form of a single lens. This is advantageous in order to make the entire system of the zoom objective compact within the scope such that the aberrations of the entire system of the zoom objective are not deteriorated badly. In the case where an aperture stop is positioned within the 2nd unit, with regard to the fact that somewhat strong power of the 1st unit is liable to result in production of large barrel type distortion in the wide angle position, the location of the 3rd unit on the image side of the aperture stop provides assurance that this distortion can be well corrected. To perform such correction effectively, a 1st good method is by constructing the 3rd unit in the form of a meniscus-shaped single lens of concave curvature toward the rear.

While the state of correction of the image aberrations is maintained excellent as such, the zoom lens system as a whole is made compact, provided that the following various conditions, which are severer than the aforesaid ones, are preferably satisfied.

$$0.5 \leq |f_I|/f_T \leq 0.9 \quad (1)$$

$$1.4 \leq |f_{III}|/f_T \leq 19 \quad (2)$$

Here, when below the lower limit of condition (1), the total length of the lens system in the telephoto position tends to be longer than in the wide angle position, and further it becomes difficult to perform good correction of spherical aberration in the telephoto position. When above the upper limit, the total length in the wide angle position is insufficiently shortened.

When below the lower limit of condition (2), it becomes difficult to take the back focus at a required value in the wide angle position and, further, the construction of the 3rd unit in the simple form becomes difficult from the standpoint of physical characteristics. When above the upper limit, this power of the 3rd unit is too weak to achieve a great advance in the compactness.

As a 2nd method, the 3rd unit is preferably constructed in the form of at least one positive lens and at least one negative lens with the axial separation, t, between the frontmost and rearmost lens surfaces of the 3rd unit falling within the following range:

$$0.04 \leq t/f_T \leq 0.25 \quad (3)$$

This also contributes to the reduction of the bulk and size of the entire lens system while still preserving good correction of aberrations.

When the upper limit of condition (3) is exceeded, the excessive thickness of the 3rd unit has an adverse effect on the reduction of the bulk and size of the entire lens system. When the lower limit is exceeded, the lens thickness becomes too thin to give a desired radius of curvature so that it becomes difficult to perform good correction of aberrations.

As to the 1st unit, according to the present invention, it is preferred to arrange a positive lens in the rearmost position with an air lens defined by the front surface of that positive lens and the rear surface of a preceding lens having a converging action. For the 2nd unit, it is preferred to use, first, two or more lenses of positive and negative powers and, second, positive lenses in this order from the front of the zoom lens.

Such construction and arrangement of the constituent lenses enables the spherical aberrations of each unit to be removed to some extent, and, therefore, facilitate an achievement of good stability of correction of spherical aberrations throughout the entire zooming range.

Besides, to achieve the valuable decrease in the bulk and size of the entire zoom lens system in such a manner as to make it possible to maintain good stability of aberration correction throughout the entire zooming range, according to the present invention, it is better to construct the diverging 1st unit of strong power in a very simple form and to suppress the amount of aberrations ascribed to this component to as small a level as possible. In this respect, the 1st lens unit is made up of, from front to rear, a meniscus-shaped negative 1st lens of forward convexity, a bi-concave negative 2nd lens, and a meniscus-shaped positive 3rd lens of forward convexity. The use of the air lens of converging action defined by the negative 2nd and positive 3rd lenses enables good correction of all aberrations to be easily performed in the telephoto positions.

The 1st unit may be otherwise constructed as comprising, from front to rear, a positive lens, a negative meniscus lens of rearward concavity, a negative lens with its rear surface having a stronger refractive power, and a positive lens with its front surface having a stronger refractive power.

With a widened angular field, to correcting the zoom objective of the invention well particularly for distortion in the wide angle positions, it is better to arrange a positive lens at the frontmost position in the 1st unit so that correction of barrel type distortion is performed by this positive lens.

Since the 1st unit has an overall refractive power of negative sign, it is required that the aforesaid positive lens be followed by a plurality of negative lenses in view of the use of an additional positive lens of which the front surface has a strong refractive power in the rear of those negative lenses with the production of an air lens of convergence between the negative and positive lenses, to thereby enable good correction of spherical aberrations in the telephoto position, thus contributing to the good stability of aberration correction over the entire zooming range.

It is to be noted here that when the number of negative lenses stated above is two, it is preferred to form the front or 1st negative lens to a meniscus shape of concave curvature toward the rear, and the negative 2nd lens to a shape of strong refractive power in the rear surface thereof, with an advantage that the spherical aberrations in the telephoto positions and the coma in the wide angle positions are well corrected.

Next, the 3rd unit when constructed by a converging or diverging lens unit has additional features that a lens of negative power and a lens of positive power are at least included, and that, letting $f_{III}$ denote the focal length of the aforesaid 3rd lens unit and fw the shortest focal length of the entire lens system, the following condition is satisfied:

$$-0.3/fw < 1/f_{III} < 0.2/fw \quad (4)$$

In order to achieve an increase in the zoom ratio up to more than two for the two-component zoom type which has found many use in zoom objectives, while still permitting the entire lens system to take a compact form, according to the prior art, it is required particularly for the positive power of the 2nd unit to be strengthened so that the prescribed equivalent zoom ratio can be obtained despite the total axial movement is lessened. In addition thereto, the negative power of the 1st unit is also strengthened so that the total length of the lens system from the front vertex to the focal plane in the wide angle position can be shortened. As has been stated above, however, the increase in the positive power of the 2nd unit results in the production of very large astigmatism as under-corrected in the wide angle positions and as over-corrected in the telephoto positions, which are difficult to cancel out.

It will be appreciated from this standpoint that the use of the additional or 3rd unit which remains stationary during zooming to the conventional two-component zoom lens system provides assurance that all aberrations can be well corrected with ease over the extended zooming range. For this purpose, the 3rd unit is constructed as comprising at least one negative lens and at least one positive lens. When the refractive power of the 3rd unit lies within the range defined by inequalities (4), good balance of aberrations in the wide angle and telephoto positions can be maintained.

Further, it is preferred that the negative and positive lenses of the third unit are cemented together at their adjoining surfaces to form a doublet of meniscus shape convex toward the rear, and the index of refraction of the glass from which the negative lens of the third unit is made up is made higher than that of refraction of the glass from which the positive lens of the third unit is made up. Such doublet produces either over-corrected or under-corrected astigmatism when in the wide angle or telephoto positions respectively, thereby the stabilization of the astigmatism can be obtained. The use of the glass having the higher index of refraction in the negative lens of the third unit provides improvement in that the Petzval sum, which would otherwise go negative, is directed toward positive.

For assisting in accomplishing the object of the present invention, the following condition is satisfied:

$$|f_I| \leq |f_T| \quad (5)$$

In this connection, it should be explained that when an independent focusing movement is imparted into the 1st unit, the required diameter of the front member tends to rapidly increase for an object at shorter distances. To account for this, it is better to strengthen the power of the 1st unit to some extent so that the total forward movement is reduced. The above-stated condition (5) represents a range of refractive powers allowable for the 1st unit. Though too great an increase in the refractive power of the 1st unit is advantageous at reducing the diameter of the front member, the barrel type distortion in the wide angle positions and the spherical aberration in the telephoto positions are caused to rapidly increase. Thus, it becomes difficult to maintain good stability of aberration correction throughout the zooming range. Therefore, it is preferred that the refractive power of the 1st unit is not too strengthened, leaving it to be on the order:

$$|f_I| \geq |f_T/2|$$

As to the diaphragm, for the zoom objective of the present invention, it is preferred from the standpoint of aberration correction that the diaphragm is positioned in a space within the 2nd unit, or adjacent the front or rear surface thereof and made movable in the same direction as the 2nd unit during zooming. When it is not desired to move the diaphragm, it is better to arrange it in a space between the 2nd and 3rd unit.

Next, explanation will be made about the function and effect of the 3rd unit based on the theory of aberrations. Taking a specific example 2 of the invention, to be described later, with the aperture stop in a space between the 1st and 2nd lenses counting from front in the 2nd lens unit, the 1st, 2nd and 3rd lens units have Seidel's aberration coefficients of 3rd order listed in Table 1.

As is evident from Table 1, the 3rd lens unit has, despite zooming the ability to give constant spherical aberration (SA), but astigmatism (AS) and distortion (DS) both act toward providing over-correction, and astigmatism (AS) is shown to be strong in the wide angle positions, and weak in the telephoto positions. Since, in the zoom objective of the invention, the powers of the 1st and 2nd lens units are strengthened to some extent, the combined lens system of the 1st and 2nd units is liable to produce under-corrected astigmatism particularly in the wide angle positions. To balance out the resultant aberrations, therefore, the aforesaid rules of design for the 3rd unit are very important. Also, since the barrel type distortion is liable to increase in the wide angle positions, such design of the 3rd unit is advantageous to the compensation of this aberration.

It will be appreciated that the zoom objective of the present invention is provided with the 3rd lens unit having the function of compensating for the aberrations produced from the 1st and 2nd lens units. In this respect, as compared with the mere combination of the conventional two-component zoom objective of which the aberration correction is completed in itself and an additional lens releasably inserted into the space between that objective and the image plane, or a so-called rear attachment lens (which is corrected for aberrations of itself only) to convert the range of focal lengths, that is, as compared with an apparent 3-component zoom objective, the zoom objective of the present invention has fundamentally different provisions, features and results. It is therefore remarkably improved over the prior art system obtained by adding a new converter lens to the zoom objective comprised of the negative and positive lens units to change the focal length range.

Another example of the 3rd lens unit when being either converging or diverging is given in Table 2 for the 3rd order aberration coefficients of an embodiment 9 of the invention. With reference to Table 2, what results are practically attained by the use of the 3rd lens unit is concretely clarified below. The sum of the 3rd order astigmatic aberration coefficients produced from the 1st and 2nd lens units is 0.077 in the wide angle position and −0.05 in the telephoto position as seen in Table 2, representing the residual astigmatism as under-corrected when in the wide angle position, and over-corrected when in the telephoto position. On the other hand, the 3rd lens unit gives a value of −0.0551 when in the wide angle position and 0.0504 when in the telephoto position. Therefore, the entire lens system of the 1st through 3rd lens units has values of 0.0219 and 0.0004 in the wide angle and telephoto positions respectively, thus giving good balance. Such improved results are attained when the refractive power of the 3rd lens unit falls within the range defined by the aforesaid inequalities (4). When the lower limit of condition (4) is exceeded, as the negative refractive power becomes too strong, it becomes difficult to retain the required value of back focus in the wide angle positions. Further, as the refractive power of the 2nd lens unit is caused to increase, the good stabilization of aberrations against zooming also becomes very difficult to hold. Conversely when the upper limit is exceeded, the power of the 2nd lens unit becomes too weak to reduce the bulk and size of the lens system without having difficulty in the limitation that the zooming range be maintained in extended manner.

It is to be noted that focusing of the zoom objective of the invention may be performed either by moving the entire lens system, or by moving the 1st and 2nd lens units, while the 3rd lens unit remains stationary during focusing, or by moving only either one of the 1st and 2nd lens units.

Though the embodiments 8 and 9 of the invention has been illustrated in connection with the 3rd lens unit of the cemented form consisting of the negative and positive lenses, it is, of course, also possible to make use of two or more singlets, thereby giving an advantage that the focusing provision can be made at part of the 3rd lens unit by an operating mechanism of simplified structure.

Examples of specific zoom objectives of the invention can be constructed in accordance with the following numerical data for the radii of curvature, R, the axial thicknesses or air separations, D, and the refractive indices, N, and the Abbe numbers, ν, of the glasses of the lens elements, with subscripts numbered consecutively from front to rear.

EXAMPLE 2-continued

| | | | |
|---|---|---|---|
| D14 | 4.1469 | 32.9514 | 55.3056 |

TABLE 1

Seidel's 3rd Order Aberration Coefficients

| | | L | T | SA | CM | AS | PT | DS |
|---|---|---|---|---|---|---|---|---|
| 1st Lens Group | (W) | −0.00276 | 0.00261 | −0.6184 | 0.1603 | −0.1954 | −0.4682 | 0.5524 |
| | (M) | −0.00622 | 0.00208 | −3.1308 | 0.0940 | −0.1567 | −0.4682 | 0.1616 |
| | (T) | −0.00985 | 0.00178 | −7.8578 | −0.0916 | −0.1549 | −0.4682 | 0.0734 |
| 2nd Lens Group | (W) | 0.00586 | −0.00068 | 2.9153 | −0.0218 | 0.2849 | 0.6529 | −0.1534 |
| | (M) | 0.00781 | −0.00080 | 6.4473 | 0.0790 | 0.2019 | 0.6529 | −0.1020 |
| | (T) | 0.00944 | −0.00086 | 10.6158 | 0.1208 | 0.1561 | 0.6529 | −0.0780 |
| 3rd Lens Group | (W) | −0.00289 | −0.00068 | −0.0026 | 0.1545 | −0.0474 | −0.1019 | −0.1048 |
| | (M) | −0.00289 | −0.00094 | −0.0026 | 0.1543 | −0.0193 | −0.1019 | −0.1232 |
| | (T) | −0.00289 | −0.00109 | −0.0026 | 0.1542 | −0.0033 | −0.1019 | −0.1302 |
| Total Sum | (W) | 0.00020 | 0.00124 | 2.2942 | 0.2930 | 0.0420 | 0.0827 | 0.2940 |
| | (M) | −0.00129 | 0.00033 | 3.3138 | 0.3273 | 0.0258 | 0.0827 | −0.0636 |
| | (T) | −0.00329 | −0.00017 | 2.7552 | 0.1834 | −0.0021 | 0.0827 | −0.1347 |

W: Wide Angle Setting
L: Longitudinal Chromatic Aberration
M: Intermediate Setting
T: Transverse Chromatic Aberration
T: Telephoto Setting
SA: Spherical Aberration
CM: Coma
AS: Astigmatism
PT: Petzval Sum
DS: Distortion

EXAMPLE 1

$F = 100-189 \quad FNO = 1:4-4.5 \quad 2\omega = 62°-35.3°$

| R1 = 82.39 | D1 = 4.31 | N1 = 1.69680 | $\nu_1$ = 55.5 |
|---|---|---|---|
| R2 = 45.34 | D2 = 21.70 | | |
| R3 = −328.65 | D3 = 3.75 | N2 = 1.69680 | $\nu_2$ = 55.5 |
| R4 = 252.09 | D4 = 1.12 | | |
| R5 = 67.23 | I = 7.42 | N3 = 1.75520 | $\nu_3$ = 27.5 |
| R6 = 103.13 | D6 = Variable | | |
| R7 = 83.86 | D7 = 8.39 | N4 = 1.69680 | $\nu_4$ = 55.5 |
| R8 = −288.84 | D8 = 5.56 | | |
| R9 = 46.77 | D9 = 11.62 | N5 = 1.59551 | $\nu_5$ = 39.2 |
| R10 = −243.86 | D10 = 2.50 | N6 = 1.80518 | $\nu_6$ = 25.4 |
| R11 = 146.60 | D11 = 2.20 | | |
| R12 = −638.19 | D12 = 6.95 | N7 = 1.80518 | $\nu_7$ = 25.4 |
| R13 = 43.96 | D13 = 11.30 | | |
| R14 = 182.85 | D14 = 6.93 | N8 = 1.67270 | $\nu_8$ = 32.1 |
| R15 = −90.59 | D15 = Variable | | |
| R16 = 133.50 | D16 = 4.17 | N9 = 1.48749 | $\nu_9$ = 70.1 |
| R17 = 93.05 | | | |

| f | 100 | 139 | 189 | $f_I$ = −132.11 |
|---|---|---|---|---|
| D6 | 65.1762 | 27.5967 | 2.0509 | $f_{III}$ = −652.02 |
| D15 | 4.1667 | 26.4948 | 55.1514 | |

EXAMPLE 2

$F = 100-189 \quad FNO = 1:4-4.5 \quad 2\omega = 62°-35.3°$

| R1 = 82.65 | D1 = 4.31 | N1 = 1.69680 | $\nu_1$ = 55.5 |
|---|---|---|---|
| R2 = 45.31 | D2 = 21.19 | | |
| R3 = −315.25 | D3 = 3.75 | N2 = 1.69680 | $\nu_2$ = 55.5 |
| R4 = 262.54 | D4 = 0.71 | | |
| R5 = 66.92 | D5 = 7.10 | N3 = 1.75520 | $\nu_3$ = 27.5 |
| R6 = 103.67 | D6 = Variable | | |
| R7 = 83.95 | D7 = 8.49 | N4 = 1.69680 | $\nu_4$ = 55.5 |
| R8 = −326.95 | D8 = 5.56 | | |
| R9 = 46.73 | D9 = 10.61 | N5 = 1.60729 | $\nu_5$ = 49.2 |
| R10 = 144.02 | D10 = 2.57 | | |
| R11 = −493.88 | D11 = 8.93 | N6 = 1.84666 | $\nu_6$ = 23.9 |
| R12 = 43.65 | D12 = 11.16 | | |
| R13 = 195.02 | D13 = 8.10 | N7 = 1.68893 | $\nu_7$ = 31.1 |
| R14 = −95.78 | D14 = Variable | | |
| R15 = 121.54 | D15 = 4.17 | N8 = 1.48749 | $\nu_8$ = 70.1 |
| R16 = 88.20 | | | |

| f | 100 | 150 | 189 | $f_I$ = −133.33 |
|---|---|---|---|---|
| D6 | 65.6161 | 20.5836 | 2.0744 | $f_{III}$ = −687.9 |

EXAMPLE 3

$F = 100-183 \quad FNO = 1:3.5-4.5 \quad 2\omega = 73.8°-44.4°$

| R1 = 374.93 | D1 = 11.66 | N1 = 1.60311 | $\nu_1$ = 60.7 |
|---|---|---|---|
| R2 = −1407.76 | D2 = 0.69 | | |
| R3 = 581.66 | D3 = 4.98 | N2 = 1.80610 | $\nu_2$ = 40.9 |
| R4 = 61.37 | D4 = 17.44 | | |
| R5 = 721.08 | D5 = 4.39 | N3 = 1.77250 | $\nu_3$ = 49.6 |
| R6 = 123.67 | D6 = 7.67 | | |
| R7 = 94.58 | D7 = 11.69 | N4 = 1.80518 | $\nu_4$ = 25.4 |
| R8 = 368.29 | D8 = Variable | | |
| R9 = 231.88 | D9 = 8.58 | N5 = 1.57250 | $\nu_5$ = 57.8 |
| R10 = −232.39 | D10 = 6.90 | | |
| R11 = 62.52 | D11 = 10.22 | N6 = 1.71300 | $\nu_6$ = 53.8 |
| R12 = 264.24 | D12 = 13.95 | | |
| R13 = −175.13 | D13 = 10.82 | N7 = 1.84666 | $\nu_7$ 6 23.9 |
| R14 = 67.54 | D14 = 3.82 | | |
| R15 = 3053.40 | D15 = 6.11 | N8 = 1.59551 | $\nu_2$ = 39.2 |
| R16 = −264.50 | D16 = 0.69 | | |
| R17 = 558.05 | D17 = 9.17 | N9 = 1.63636 | $\nu_9$ = 35.4 |
| R18 = −78.28 | D18 = Variable | | |
| R19 = 137.93 | D19 = 5.17 | N10 = 1.48749 | $\nu_{10}$ = 70.1 |
| R20 = 116.59 | | | |

| f | 100 | 138 | 183 | $f_I$ = −134.48 |
|---|---|---|---|---|
| D8 | 73.17 | 30.36 | 2.57 | $f_{III}$ = −1679.4 |
| D18 | 3.79 | 32.37 | 66.33 | |

EXAMPLE 4

$F = 100-187.5 \quad FNO = 1:3.5-4.5 \quad 2\omega = 74.2°-43.6°$

| R1 = 179.97 | D1 = 16.61 | N1 = 1.60311 | $\nu_1$ = 60.7 |
|---|---|---|---|
| R2 = 12603.22 | D2 = 0.69 | | |
| R3 = 665.08 | D3 = 5.01 | N2 = R1 = 1.49.6 | $\nu_2$ |
| D4 = 54.55 | D4 = 19.70 | | |
| D5 = 6112.91 | D5 = 4.42 | N3 = 1.71300 | $\nu_3$ = 53.8 |
| R6 = 143.50 | D6 = 5.70 | | |
| R7 = 85.53 | D7 = 11.12 | N4 = 1.75520 | $\nu_4$ = 27.5 |
| R8 = 232.34 | D8 = Variable | | |
| R9 = 231.21 | D9 = 8.66 | N5 = 1.60311 | $\nu_5$ = 60.7 |
| R10 = −228.38 | D10 = 6.74 | | |
| R11 = 62.02 | D11 = 17.23 | N6 = 1.69680 | $\nu_6$ = 55.5 |
| R12 = 223.95 | D12 = 8.08 | | |
| R13 = −154.30 | D13 = 6.62 | N7 = 1.80518 | $\nu_7$ = 25.4 |
| R14 = 70.50 | D14 = 4.06 | | |
| R15 = −428.90 | D15 = 6.68 | N8 = 1.58144 | $\nu_8$ = 40.7 |
| R16 = −133.81 | D16 = 0.67 | | |
| R17 = 998.25 | D17 = 9.44 | N9 = 1.60342 | $\nu_9$ = 38.0 |

EXAMPLE 4-continued

| | | |
|---|---|---|
| R18 = −77.29 | D18 = Variable | |
| R19 = 93.76 | D19 = 5.21 | N10 = 1.48749  ν10 = 70.1 |
| R20 = 86.46 | | |

| f | 100 | 138.9 | 187.5 | $f_I$ = −128.0 |
|---|---|---|---|---|
| D8 | 67.00 | 29.86 | 3.79 | $f_{III}$ = −2971.8 |
| D18 | 3.82 | 35.17 | 74.35 | |

EXAMPLE 5

F = 100-183    FNO = 1:3.5-4.5    2ω = 73.8°-44.4°

| | | |
|---|---|---|
| R1 = 527.97 | D1 = 10.61 | N1 = 1.60311  ν1 = 60.7 |
| R2 = −835.09 | D2 = 0.69 | |
| R3 = 834.67 | D3 = 4.98 | N2 = 1.80610  ν2 = 40.9 |
| R4 = 62.46 | D4 = 17.27 | |
| R5 = 664.30 | D5 = 4.39 | N3 = 1.80400  ν3 = 46.6 |
| R6 = 117.47 | D6 = 6.79 | |
| R7 = 94.41 | D7 = 12.65 | N4 = 1.80518  ν4 = 25.4 |
| R8 = 557.13 | D9 = Variable | |
| R9 = 233.32 | D9 = 8.37 | N5 = 1.62280  ν5 = 57.0 |
| R10 = −266.37 | D10 = 7.94 | |
| R11 = 68.97 | D11 = 10.57 | N6 = 1.71300  ν6 = 53.8 |
| R12 = 265.65 | D12 = 0.52 | |
| R13 = 134.55 | D13 = 9.15 | N7 = 1.56732  ν7 = 42.8 |
| R14 = 268.61 | D14 = 4.89 | |
| R15 = −172.48 | D15 = 13.01 | N8 = 1.84666  ν8 = 23.9 |
| R16 = 65.89 | D16 = 6.70 | |
| R17 = 382.00 | D17 = 10.99 | N9 = 1.62004  ν9 = 36.3 |
| R18 = −68.01 | D18 = Variable | |
| R19 = 137.93 | D19 = 5.17 | N10 = 1.48749  ν10 = 70.1 |
| R20 = 113.60 | | |

| f | 100 | 137.9 | 183 | $f_I$ = −134.46 |
|---|---|---|---|---|
| D8 | 74.17 | 31.16 | 3.24 | $f_{III}$ = −1419.97 |
| D18 | 3.79 | 31.77 | 65.02 | |

EXAMPLE 6

F = 100-189    FNO = 1:4-4.5    2ω = 62°-35.3°

| | | |
|---|---|---|
| R1 = 84.825 | D1 = 4.17 | N1 = 1.69680  ν1 = 55.5 |
| R2 = 42.356 | D2 = 14.77 | |
| R3 = −269.874 | D3 = 3.33 | N2 = 1.69680  ν2 = 55.5 |
| R4 = 253.751 | D4 = 1.20 | |
| R5 = 64.681 | D5 = 5.18 | N3 = 1.64769  ν3 = 33.8 |
| R6 = 146.374 | D6 = Variable | |
| R7 = 82.793 | D7 = 8.55 | N4 = 1.65844  ν4 = 50.9 |
| R8 = −254.758 | D8 = 0.42 | |
| R9 = 51.671 | D9 = 8.70 | N5 = 1.66892  ν5 = 45.0 |
| R10 = 228.819 | D10 = 5.80 | |
| R11 = −292.325 | D11 = 10.01 | N6 = 1.84666  ν6 = 23.9 |
| R12 = 43.462 | D12 = 12.27 | |
| R13 = 364.553 | D13 = 7.56 | N7 = 1.63636  ν7 = 35.4 |
| R14 = −74.877 | D14 = Variable | |
| R15 = −658.084 | D15 = 2.78 | N8 = 1.60311  ν8 = 60.7 |
| R16 = 98.754 | D16 = 1.04 | |
| R17 = 113.422 | D17 = 8.33 | N9 = 1.57099  ν9 = 50.8 |
| R18 = −4278.609 | | |

| f | 100 | 150 | 189 | $f_I$ = −133.33 |
|---|---|---|---|---|
| D6 | 71.8061 | 24.8926 | 5.6103 | $f_{III}$ = −549.96 |
| D14 | 4.1667 | 31.0787 | 51.9624 | |

EXAMPLE 7

F = 100-189    FNO = 1:4-4.5    2ω = 62°-35.3°

| | | |
|---|---|---|
| R1 = 85.496 | D1 = 4.17 | N1 = 1.69680  ν1 = 55.5 |
| R2 = 44.543 | D2 = 19.14 | |
| R3 = −244.153 | D3 = 3.33 | N2 = 1.69680  ν2 = 55.5 |
| R4 = 395.064 | D4 = 0.16 | |
| R5 = 66.007 | D5 = 5.82 | N3 = 1.75520  ν3 = 27.5 |
| R6 = 105.219 | D6 = Variable | |
| R7 = 75.991 | D7 = 8.31 | N4 = 1.62299  ν4 = 58.2 |
| R8 = −341.577 | D8 = 5.56 | |
| R9 = 54.235 | D9 = 5.08 | N5 = 1.67003  ν5 = 47.3 |
| R10 = 98.156 | D10 = 0.42 | |
| R11 = 58.163 | D11 = 4.28 | N6 = 1.51742  ν6 = 52.4 |
| R12 = 114.480 | D12 = 3.52 | |

EXAMPLE 7-continued

| | | |
|---|---|---|
| R13 = −772.289 | D13 = 7.02 | N7 = 1.84666  ν7 = 23.9 |
| R14 = 42.489 | D14 = 13.62 | |
| R15 = 221.276 | D15 = 6.12 | N8 = 1.68893  ν8 = 31.1 |
| R16 = −94.558 | D16 = Variable | |
| R17 = 833.334 | D17 = 2.78 | N9 = 1.58913  ν9 = 61.0 |
| R18 = 91.667 | D18 = 2.22 | |
| R19 = 112.083 | D19 = 8.33 | N10 = 1.56883  ν10 = 56.3 |
| R20 = −277.778 | D20 = 2.78 | N11 = 1.58267  ν11 = 46.4 |
| R21 = 464.309 | | |

| f | 100 | 150 | 189 | $f_I$ = −133.33 |
|---|---|---|---|---|
| D6 | 68.2795 | 21.3655 | 2.0831 | $f_{III}$ = −525.25 |
| D16 | 4.1667 | 31.0781 | 51.9614 | |

EXAMPLE 8

F = 100-282.8    FNO = 1:4    2ω = 74.2°-29.6°

| | | |
|---|---|---|
| R1 = 493.48 | D1 = 22.60 | N1 = 1.58913  ν1 = 61.0 |
| R2 = 43207.35 | D2 = 0.56 | |
| R3 = 271.10 | D3 = 7.23 | N2 = 1.80400  ν2 = 46.6 |
| R4 = 83.08 | D4 = 36.24 | |
| R5 = 1141.79 | D5 = 20.35 | N3 = 1.63636  ν3 = 35.4 |
| R6 = −169.91 | D6 = 5.28 | N4 = 1.81600  ν4 = 46.6 |
| R7 = 348.65 | D7 = 8.15 | |
| R8 = 134.93 | D8 = 11.19 | N5 = 1.84666  ν5 = 23.9 |
| R9 = 216.32 | D9 = Variable | |
| R10 = 193.19 | D10 = 9.57 | N6 = 1.65160  ν6 = 58.6 |
| R11 = −2225.65 | D11 = 9.47 | |
| R12 = 104.05 | D12 = 14.53 | N7 = 1.65160  ν7 = 58.6 |
| R13 = 300.97 | D13 = 0.56 | |
| R14 = 101.53 | D14 = 15.09 | N8 = 1.65160  ν8 = 58.6 |
| R15 = 286.37 | D15 = 4.50 | |
| R16 = −13040.32 | D16 = 13.16 | N9 = 1.84666  ν9 = 23.9 |
| R17 = −295.65 | D17 = 5.62 | N10 = 1.80518  ν10 = 25.4 |
| R18 = 64.59 | D18 = 10.12 | |
| R19 = 443.95 | D19 = 11.21 | N11 = 1.74950  ν11 = 35.3 |
| R20 = −197.19 | D20 = Variable | |
| R21 = −224.63 | D21 = 4.88 | N12 = 1.80400  ν12 = 46.6 |
| R22 = −925.08 | D22 = 17.63 | N13 = 1.57501  ν13 = 41.5 |
| R23 = −166.38 | | |

| f | 100 | 189.7 | 282.8 | $f_I$ = −175.04 |
|---|---|---|---|---|
| D9 | 162.172 | 46.79 | 4.415 | $f_{II}$ = 137.94 |
| D20 | 13.745 | 83.638 | 156.22 | $f_{III}$ = 3461.5 |

EXAMPLE 9

F = 100-282.8    FNO = 1:4    2ω = 74.4°-29.4°

| | | |
|---|---|---|
| R1 = 454.86 | D1 = 17.61 | N1 = 1.58913  ν1 = 61.0 |
| R2 = ∞ | D2 = 0.52 | |
| R3 = 258.52 | D3 = 6.65 | N2 = 1.80400  ν2 = 46.6 |
| R4 = 77.29 | D4 = 30.08 | |
| R5 = 1060.71 | D5 = 18.75 | N3 = 1.63636  ν3 = 35.4 |
| R6 = −209.21 | D6 = 1.72 | |
| R7 = 181.99 | D7 = 4.86 | N4 = 1.81600  ν4 = 46.6 |
| R8 = 315.91 | D8 = 6.32 | |
| R9 = 130.35 | D9 = 10.20 | N5 = 1.84666  ν5 = 23.9 |
| R10 = 237.08 | D10 = Variable | |
| R11 = 172.07 | D11 = 12.40 | N6 = 1.65160  ν6 = 58.6 |
| R12 = −2054.55 | D12 = 8.41 | |
| R13 = 95.77 | D13 = 13.37 | N7 = 1.65160  ν7 = 58.6 |
| R14 = 258.71 | D14 = 0.52 | |
| R15 = 93.62 | D15 = 13.89 | N8 = 1.65160  ν8 = 58.6 |
| R16 = 274.40 | D16 = 4.03 | |
| R17 = −15615.92 | D17 = 11.78 | N9 = 1.84666  ν9 = 23.9 |
| R18 = −311.75 | D18 = 5.17 | N10 = 1.80518  ν10 = 25.4 |
| R19 = 59.55 | D19 = 10.65 | |
| R20 = 376.39 | D20 = 11.37 | N11 = 1.74950  ν11 = 35.3 |
| R21 = −183.24 | D21 = Variable | |
| R22 = −157.12 | D22 = 4.48 | N12 = 1.81600  ν12 = 46.6 |
| R23 = −2321.56 | D23 = 13.89 | N13 = ν13 = 40.7 |

EXAMPLE 9-continued

R24 = −128.98    1.58144

| f | 100 | 189.7 | 282.8 | $f_I$ = | −161.1 |
|---|---|---|---|---|---|
| D10 | 148.058 | 41.857 | 2.854 | $f_{II}$ = | 127. |
| D21 | 12.651 | 76.983 | 143.79 | $f_{III}$ = | −3089. |

TABLE 2

| | | Seidel's 3rd Order Aberration Coefficients | | | | | | |
|---|---|---|---|---|---|---|---|---|
| | | L | T | SA | CM | AS | PT | DS |
| 1st | (W) | 0.00106 | 0.00342 | −0.1799 | 0.1869 | −0.1371 | −0.3309 | 0.5066 |
| Lens | (M) | 0.00380 | 0.00372 | −2.3269 | 0.4908 | −0.0464 | −0.3309 | 0.0941 |
| Group | (T) | 0.00845 | 0.00390 | −11.4974 | 0.8476 | −0.0053 | −0.3309 | 0.0337 |
| 2nd | (W) | 0.00493 | −0.00386 | 2.1780 | −0.1784 | 0.2142 | 0.3852 | −0.1630 |
| Lens | (M) | 0.00009 | −0.00465 | 6.7741 | −0.3345 | 0.0565 | 0.3852 | −0.0950 |
| Group | (T) | −0.00986 | −0.00512 | 13.6937 | −0.9185 | −0.0447 | 0.3852 | −0.0610 |
| 3rd | (W) | −0.00147 | 0.00161 | −0.6479 | 0.3381 | −0.0551 | 0.0026 | −0.0014 |
| Lens | (M) | −0.00147 | 0.00144 | −0.6479 | 0.2609 | 0.0162 | 0.0026 | −0.0075 |
| Group | (T) | −0.00147 | 0.00133 | −0.6479 | 0.2144 | 0.0504 | 0.0026 | 0.0000 |
| 1st + | (W) | 0.00599 | −0.00044 | 1.9981 | 0.0085 | 0.0770 | 0.0543 | 0.3436 |
| 2nd | (M) | 0.00389 | −0.00093 | 4.4472 | 0.1563 | 0.0102 | 0.0543 | −0.0008 |
| Groups | (T) | −0.00141 | −0.00122 | 2.1963 | −0.0709 | −0.0500 | 0.0543 | −0.0272 |
| | (W) | 0.00451 | 0.00117 | 1.3502 | 0.3466 | 0.0219 | 0.0569 | 0.3422 |
| Total | (M) | 0.00242 | 0.00051 | 3.7993 | 0.4173 | 0.0264 | 0.0569 | −0.0083 |
| Sum | (T) | −0.00289 | 0.00011 | 1.5484 | 0.1435 | 0.0004 | 0.0569 | −0.0272 |

What I claim is:

1. A wide angle zoom objective of reduced size comprising:
    a first lens unit, a second lens unit, and a third lens unit arranged from the object side;
    said first lens unit being divergent, said second lens unit being convergent, and said third lens unit being stationary during zooming; and
    a diaphragm for controlling a light flux passing through the zoom objective,
    said first lens unit and said second lens unit moving for zooming along the optical axis and said diaphragm being associated with said second lens unit.

2. A wide angle zoom objective of reduced size according to claim 1, wherein said 3rd lens unit is a diverging lens unit.

3. A wide angle zoom objective of reduced size according to claim 2, wherein letting $f_{III}$ denote the focal length of said 3rd lens unit and $f_T$ the longest focal length of the entire lens system, we have $$|f_{III}| \geq f_T.$$

4. A wide angle zoom objective of reduced size according to claim 3, wherein letting $f_I$ denote the focal length of said 1st lens unit, we have $$|f_I| \leq f_T.$$

5. A wide angle zoom objective of reduced size according to claim 4 wherein said 3rd lens unit comprises a meniscus-shaped lens of negative refractive power concave toward the rear.

6. A wide angle zoom objective of reduced size according to claim 4, wherein said 3rd lens unit has at least one positive lens and at least one negative lens, and the following condition is satisfied:

$$0.04 \leq t/f_T \leq 0.25$$

where t is the thickness from the front-most lens surface of the third lens unit to the rear-most lens surface.

7. A wide angle zoom objective according to claim 4, wherein
    said 1st lens unit comprises, from front to rear,
    a meniscus-shaped lens of negative refractive power convex toward the front,
    a bi-concave lens of negative refractive power, and
    a meniscus-shaped lens of positive refractive power convex toward the front.

8. A wide angle zoom objective according to claim 4, wherein
    said 1st lens unit comprises, from front to rear,
    a lens of positive refractive power,
    a meniscus-shaped lens of negative refractive power concave toward the rear,
    a lens of negative refractive power with its rear lens surface having a stronger refractive power, and
    a lens of positive refractive power with its front lens surface having a stronger refractive power.

9. A wide angle zoom objective according to claim 1, wherein
    said 3rd lens unit has at least one negative lens and at least one positive lens; and
    letting $f_{III}$ denote the focal length of said 3rd lens unit, and fw the shortest focal length of the entire lens system,
    the following condition is satisfied:

$$-0.3/fw < 1/f_{III} < 0.2/fw.$$

10. A wide angle zoom objective of reduced size according to claim 9, wherein
    said negative lens and said positive lens are cemented together to form a meniscus-shaped doublet convex toward the rear; and
    the refractive index of the glass of said negative lens is higher than that of the glass of said positive lens.

11. A wide angle zoom objective of reduced size according to claim 10, wherein
    letting $f_I$ denote the focal length of said 1st lens unit, and $f_T$ the longest focal length of the entire lens system,
    the following condition is satisfied:

$$|f_I| \leq f_T.$$

12. A wide angle zoom objective according to claim 1, in which the first lens unit occupies a position closer to the image when it is at the telescope end of zooming than when it is at the wide angle end.

13. A wide angle zoom objective of reduced size comprising:

a first lens unit, a second lens unit, and a third lens unit arranged from the object side;

said first lens unit being divergent, said second lens unit being convergent, and said third lens unit being stationary during zooming; and letting $f_I$ denote the focal length of said first lens unit and $f_T$ the longest focal length of the entire lens system, the following condition is satisfied:

$$|f_I| \leqq f_T.$$

14. A wide angle zoom objective of reduced size comprising:

a first lens unit, a second lens unit, and a third lens unit arranged from the object side;

said first lens unit being divergent, said second lens unit being convergent, and said third lens unit being stationary during zooming; and the following condition is satisfied:

$$0.04 \leqq t/f_T \leqq 0.25$$

where t is the thickness from the front-most lens surface of the third lens unit to the rear-most lens surface.

15. A wide angle zoom objective of reduced size according to claim 14, wherein said third lens unit has at least one positive lens and at least one negative lens.

16. A wide angle zoom objective of reduced size comprising:

a first lens unit, a second lens unit, and a third lens unit arranged from the object side;

said first lens unit being divergent, said second lens unit being convergent, and said third lens unit being stationary during zooming and being composed of a single lens.

17. A wide angle zoom objective or reduced size comprising:

a first lens unit, a second lens unit, and a third lens unit arranged from the object side;

said first lens unit being divergent, said second lens unit being convergent, and said third lens unit being stationary during zooming and being composed of a cemented lens.

18. A wide angle zoom objective of reduced size comprising:

a first lens unit, a second lens unit, and a third lens unit arranged from the object side;

said first lens unit being divergent, said second lens unit being convergent, and said third lens unit being stationary during zooming and being composed of a negative single lens, and a positive single lens, separated by air from said negative lens.

19. A wide angle zoom objective of reduced size comprising:

a first lens unit, a second lens unit, and a third lens unit arranged from the object side;

said first lens unit being divergent, said second lens unit being convergent, and said third lens unit being stationary during zooming and being composed of a single lens and a cemented lens separated by airs from said single lens.

* * * * *